Patented Sept. 13, 1949

2,482,011

UNITED STATES PATENT OFFICE 2,482,011

PRODUCTION OF CELLULOSE ETHERS

James Hutchison MacGregor, Bocking, Braintree, England, assignor to Courtaulds Limited, London, England, a British company No Drawing. Application February 7, 1946, Serial No. 646,193. In Great Britain March 9, 1945

4 Claims. (Cl. 260—23)

This invention relates to the production of cellulose ethers, in particular cellulose ethers containing the cyanoethyl (—O—$CH_2$—$CH_2$—CN) group.

United States Patent No. 2,349,797 describes a process of preparing a water-soluble, alkali-soluble carboxyethyl cellulose ether which comprises reacting by mixing within the temperature range of 5° and 35° centigrade cellulose, a solution containing about 15 per cent to about 40 per cent of a strongly basic, water-soluble hydroxide in an amount at least molecularly proportional to the glucose units of the cellulose, and about 0.2 to about 0.5 molecular proportion of acrylonitrile per glucose unit of the cellulose, until the reaction mixture is extensible with a 5 per cent to 10 per cent solution of a strong alkali hydroxide to form a substantially homogeneous solution or paste. United States Patent No. 2,332,048 describes a method of preparing a water-soluble carboxyethyl cellulose ether from cellulose which comprises reacting in the temperature range of 5° centigrade to 35° centigrade cellulose with an aqueous solution containing from about 10 per cent to about 40 per cent of a strongly basic water-soluble hydroxide and at least one molecular proportion of acrylonitrile per glucose unit of the cellulose, the amount of the hydroxide being at least molecularly equivalent to the acrylonitrile, reacting with the cellulose, and the reaction being continued until the reaction mixture is extensible with water to form a substantially homogeneous solution or paste, even when acidified. United States Patent No. 2,332,049 describes the process of preparing organic solvent-soluble cyanoethyl cellulose ether, which comprises reacting cellulose and about two to about three mols of acrylonitrile per glucose unit of the cellulose between 0° and 30° centigrade in the presence of a water-soluble strongly basic hydroxide in an aqueous solution of 10 per cent to 30 per cent concentration and removing the hydroxide from the reaction mixture after the initial reaction.

I have now found that I can obtain cyanoethyl ethers of cellulose by reacting on viscose at a temperature not greater than 40° centigrade with at least 0.5 mol of acrylonitrile per anhydroglucose unit present in the cellulose of the viscose. In the description which follows I refer generally to the molar ratio of cellulose to acrylonitrile and it is to be understood in this connection that by "cellulose" I mean the anhydroglucose unit ($C_6H_{10}O_5$) which is the recurring unit in the cellulose.

The reaction between the sodium cellulose xanthate in the viscose and the acrylonitrile is preferably effected by shaking the reactants together at ordinary room temperature, for example in a stoppered bottle. The reaction, however, may be effected by adding the acrylonitrile dropwise to well-stirred viscose. The temperature at which the reaction is carried out should not exceed 40° centigrade since the acrylonitrile at temperatures above 40° centigrade tends to undergo polymerization and undesirable gels are obtained. The time of reaction is usually from three to five hours, and it has been found that times longer than five hours are undesirable owing to hydrolysis of the cyanoethyl cellulose ethers resulting in a decreased nitrogen content in the product.

The products obtained according to the present invention are insoluble in organic solvents such as alcohol and acetone and are generally soluble in aqueous alkali, but may be water-soluble, or water-insoluble according to the conditions of the reaction.

The most important factors influencing the nature of the reaction are (1) The molar ratio between the cellulose in the viscose and the acrylonitrile,
(2) The proportion of caustic soda present in the viscose, and
(3) The ripeness of the viscose.

For the purpose of the present invention the ripeness is measured by the ammonium chloride ripeness number which is the number of cubic centimetres of a 10 per cent aqueous solution of ammonium chloride required to cause commencement of coagulation of 20 grams of viscose diluted with 30 cubic centimetres of water (see, for example, Ott, "Cellulose and Cellulose Derivatives," New York, 1943, page 837: also Hottenroth, Chemiker Zeitung, volume 39, (1915), page 119).

The molar ratio between the cellulose in the viscose and the acrylonitrile has a great influence on the nitrogen content and the solubility characteristics of the cellulose cyanoethyl ether obtained. Thus, when using a viscose containing 8 per cent of cellulose and 6 per cent of caustic soda, the products obtainable on reaction with acrylonitrile are as follows:

1. When the molar ratio of cellulose to acrylonitrile is 1:0.5 to about 1.2, the ether products are water-insoluble and alkali-soluble, and contain up to about 2 per cent of nitrogen. Thus, with a cellulose to acrylonitrile ratio of 1:0.75 a water-insoluble, alkali-soluble product containing 1.92 per cent of nitrogen corresponding to 0.24 cyanoethyl group per anhydroglucose unit, is obtained.

2. When the molar ratio of cellulose to acrylonitrile is 1:1.5 the product is water-soluble; when the molar ratio of cellulose to acrylonitrile is in the intermediate range of 1: more than 1.2 but less than 1.5 the products obtained are completely alkali-soluble but are part water-soluble and part water-insoluble.

3. When the molar ratio of cellulose to acrylonitrile is 1:1.5 to 4.0 the products are both alkali-soluble and water-soluble and contain from about 2 to about 7 per cent of nitrogen. For example, when the cellulose to acrylonitrile ratio is 1:3 a water-soluble product containing about 5.5 per cent of nitrogen corresponding to 0.7 to 0.8 cyanoethyl (—O—CH₂—CH₂—CN) group per anhydroglucose unit, is obtained.

4. When the molar ratio of cellulose to acrylonitrile is 1: at least 4, the products are water-insoluble ethers possessing a decreasing alkali-solubility and an increasing tendency for solvent solubility as the molar ratio of cellulose to acrylonitrile increases. These products generally contain from about 7 to about 9.6 per cent of nitrogen, the actual percentage of nitrogen present in the cellulose ether depending on the actual molar ratio of cellulose to acrylonitrile employed in the preparation of the ether. Thus using the aforesaid viscose containing 8 per cent of cellulose and 6 per cent of caustic soda and having an ammonium chloride ripeness number of 9 the ether obtained with a 1:4 ratio contains 6.9 per cent of nitrogen; with a 1:5 ratio, the ether contains 7.6 per cent of nitrogen; with a 1:6 ratio, the ether contains 8.25 per cent of nitrogen, while with a 1:12 ratio the ether contains 9.6 per cent of nitrogen. Ratios of cellulose to acrylonitrile above 1:12 do not result in much variation in the nitrogen content of the ether obtained. The ethers which contain not more than about 9 per cent of nitrogen are soluble in 10 per cent aqueous caustic soda solution while those containing not more than about 8.5 per cent of nitrogen are soluble in 1 per cent aqueous caustic soda solution. Although the ethers are water-insoluble, those containing less than about 7 per cent of nitrogen swell in water. The ethers are also insoluble in organic solvents such as alcohol, alcohol-ether, butyl acetate, acetone and benzene; however, meta cresol slowly dissolves those ethers containing 9 per cent or more of nitrogen, whereas those with lower nitrogen content swell in meta cresol.

The addition of excess caustic soda to the viscose has the effect of causing some hydrolysis of the nitrile group, thereby lowering the nitrogen content, increasing the acidity and also affecting the solubility characteristics of the products. The increase in acidity is due to an increase in the proportion of carboxyethyl (—O—CH₂—CH₂—COOH)

groups in the final product. As one example, using a molar ratio of cellulose to acrylonitrile of 1:3 and a viscose of ammonium chloride ripeness number 8 and containing 8 per cent cellulose and 6 per cent caustic soda, a water-soluble cyanoethyl cellulose ether containing 0.7

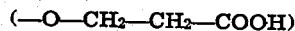

group per anhydroglucose unit is obtained. Under the same conditions and using the same viscose with its caustic soda content made up to 20 per cent, the product obtained is water-insoluble but is soluble in a 6 per cent aqueous caustic soda solution. This product is ash-free and contains 0.125 (—O—CH₂—CH₂—COOH) group and 0.09 (—O—CH₂—CH₂—CN) group per anhydroglucose unit. As a further example, using a molar ratio of cellulose to acrylonitrile of 1:1, a viscose of ammonium chloride ripeness number 9 and a reaction time of 4 hours, the ethers obtained using 6, 10 and 15 per cent of caustic soda are all insoluble in water and soluble in 10 per cent aqueous caustic soda solution and contain, respectively, 1.6, 1.45 and 0.78 per cent of nitrogen. On the other hand, the ethers obtained using 20 and 25 per cent of caustic soda are insoluble in both water and 10 per cent aqueous caustic soda solution and contain, respectively, 0.38 and 0.15 per cent of nitrogen. In order to obtain water-soluble ethers when using ratios of cellulose to acrylonitrile of 1:1.5–4.0, the caustic soda content of the viscose should not exceed 10 per cent and in order to obtain ethers which are soluble in 10 per cent aqueous caustic soda when using ratios of cellulose to acrylonitrile of 1:0.5 to about 1.2, the caustic soda content of the viscose should not exceed 15 per cent.

The ripeness of the viscose influences the number of cyanoethyl groups introduced per anhydroglucose unit of the cellulose. For example, using viscose containing 8 per cent of cellulose and 6 per cent of caustic soda and using a 1:3 molar proportion of cellulose to acrylonitrile, a water-soluble product containing 0.7 (—O—CH₂—CH₂—CN) group per anhydroglucose unit is obtained with an ammonium chloride ripeness number of 8, whereas with an ammonium chloride ripeness number of 1, a water-soluble product containing 0.45 (—O—CH₂—CH₂—CN) group per anhydroglucose unit is obtained. The effect of the ammonium chloride ripeness number is particularly marked using molar ratios of cellulose to acrylonitrile of 1:1.2 to 1.4. Thus, a viscose containing 8 per cent of cellulose and 6 per cent of caustic soda and having an ammonium chloride ripeness number of 25 with a molar ratio of cellulose to acrylonitrile of 1:1.2, gives a water-soluble product whereas the same viscose with an ammonium chloride ripeness number of 11, under the same conditions gives a water-insoluble product. A viscose containing 8 per cent of cellulose and 6 per cent of caustic soda and having an ammonium chloride ripeness number of 11, with a molar ratio of cellulose to acrylonitrile of 1:1.4 gives a water-soluble ether whereas the same viscose with an ammonium chloride ripeness number of 9 under the same conditions gives a water-insoluble product.

The water-soluble ethers may be obtained from the reaction mixture by diluting this mixture with an equal volume of water and stirring in a 15 per cent aqueous hydrochloric acid solution until the initial precipitate just redissolves to give a clear, slightly acid solution. This solution can be purified by dialysis in a regenerated cellulose casing, supported in a long glass or stainless steel tube with running softened water passing therethrough. Dialysis is continued until the solution is free from acid and sodium chloride. If the cellulose cyanoethyl ether is required as a paste, the dialysed liquid is concentrated by evaporation under reduced pressure.

If the solid ether is required the dialysed liquor is concentrated by vacuum distillation and is then

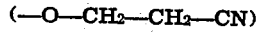

treated with alcohol or acetone to precipitate the ether. The ether is then filtered off, washed with alcohol or acetone and then air-dried at ordinary temperatures. The water-soluble ethers so obtained are white amorphous solids containing less than about 1 per cent of ash.

The cellulose cyanoethyl ether may if desired be obtained directly from the neutralized reaction mixture without the dialysing operation, by precipitating the ether by the addition thereto of alcohol or acetone. In this case the ash content of the ether is about 10 per cent.

The water-insoluble alkali-soluble cellulose cyanoethyl ethers may be obtained from the reaction mixture by pouring the mixture slowly into a 15 per cent aqueous hydrochloric acid solution at such a rate that the ether is precipitated as a moderately thick thread. It is desirable in carrying out this operation to maintain as low an excess of acid as possible in order to avoid degradation of the ether by hydrolysis. The precipitated ether is washed with water by decantation until it is free from mineral acid, and is then filtered, washed with alcohol or acetone and air-dried.

The water-soluble ethers are odourless, stable to mineral and organic acids and readily dissolve in cold or hot water to produce stable solutions. They are useful as stabilizing and emulsifying agents for example in the pigment padding and pigment printing methods of colouring textiles and may also be used as sizes and thickening agents for printing pastes. They are also useful as protective colloids which act as granulating agents in the granular polymerization of unsaturated compounds such as, for example, methyl methacrylate, acrylonitrile and diallyl maleate. Aqueous pastes of the water-soluble ethers possess good adhesive properties. The water-insoluble, alkali-soluble ethers are useful in the finishing of textile fabrics, especially for the production of permanent finishes. The ethers have the advantage that they are resistant to those micro-organisms which normally attack textiles. Both the water-soluble and the water-insoluble ethers may be used for the manufacture of films and filaments which are tough, colourless and resistant to organic solvents.

The following examples illustrate the present invention which is however not restricted thereto. The parts are by weight:

*Example 1*

1500 parts of viscose containing 8 per cent of cellulose (1 mol) and 6 per cent caustic soda and having an ammonium chloride ripeness number of 8, are mixed with 117.9 parts (3 mols) of acrylonitrile in a bottle and the reaction mixture is continuously agitated on a shaking machine at 20° centigrade for 5 hours. The reaction mixture is then diluted with an equal volume of water and a 15 per cent aqueous hydrochloric acid solution stirred in until the initially-formed precipitate redissolves to give an acid solution.

The liquid is then dialysed in a length of regenerated cellulose casing, knotted at both ends, and supported in a stainless steel tube through which a continuous supply of softened water is passed. The dialysis is continued until the liquid is free from acid and sodium chloride. The dialysed solution is then evaporated under reduced pressure until it is a moderately thick paste which is then stirred with acetone until precipitation of the ether is complete. After rinsing three times with acetone, the ether is placed on a glass plate and allowed to air-dry at room temperature.

The product obtained is a white amorphous powder soluble in water, acids and alkalies. It contains 0.92 per cent of mineral ash and 5.14 per cent nitrogen as determined by the Kjeldahl method, and based on the dry ash-free sample. This corresponds to 0.74 ($-O-CH_2-CH_2-CN$) group per anhydroglucose unit. The product contains no free carboxyl (COOH) groups. The molecular weight of the product as determined by an osmotic pressure method is about 51,000.

*Example 2*

1500 parts of viscose containing 8 per cent cellulose (1 mol) and 6 per cent caustic soda and having an ammonium chloride ripeness number of 8, are mixed with 39.3 parts (1 mol) of acrylonitrile and agitated as in Example 1, for 5 hours at 20° centigrade. The reaction mixture is diluted with an equal volume of water and the whole then stirred slowly into a slight excess of a 15 per cent aqueous hydrochloric acid solution. The precipitated ether is filtered, washed with distilled water until free from acid and sodium chloride, washed four times with cold acetone and finally air-dried on a glass plate at room temperature.

The product is a white amorphous powder insoluble in water but soluble in 5 per cent aqueous caustic soda. It contains no mineral ash, 11.5 per cent moisture and 1.92 per cent of nitrogen based on the dry ether. This corresponds to 0.24 ($-O-CH_2-CH_2-CN$) group per anhydroglucose unit of the cellulose. No free carboxyl groups are present in the ether.

*Example 3*

1500 parts of viscose containing 8 per cent of cellulose (1 mol) and 6 per cent of caustic soda and having an ammonium chloride ripeness number of 9, are mixed with 235.8 parts (6 mols) of acrylonitrile in a beaker and stirred continuously for 4 hours while the temperature of the reaction mixture is maintained at 20° centigrade. The reaction mixture is then diluted with an equal volume of water and the diluted mixture is stirred slowly into a slight excess of 15 per cent aqueous hydrochloric acid solution whereupon the ether is precipitated. The ether is filtered, washed with distilled water till free from acid and sodium chloride, washed four times with ethyl alcohol and finally air-dried at room temperature.

The product is a white amorphous powder, insoluble in water but soluble in 10 per cent aqueous caustic soda solution. It is swollen by meta cresol but is insoluble in acetone. It is free from mineral ash and contains 8.25 per cent of nitrogen, based on the weight of the dry ether. This corresponds to 1.4 ($-O-CH_2-CH_2-CN$) groups per anhydroglucose unit of the cellulose.

*Example 4*

1500 parts of viscose containing 8 per cent of cellulose (1 mol) and 6 per cent of caustic soda and having an ammonium chloride ripeness number of 9, are mixed with 471.6 parts of acrylonitrile (12 mols) in a beaker and stirred continuously for 4 hours while the temperature is maintained at 20° centigrade. The cellulose ether product is then separated, filtered, washed and dried as in Example 3.

The product is a white amorphous powder, insoluble in water but swollen in 10 per cent aqueous sodium hydroxide solution. It is soluble in meta cresol and swells in acetone. It is free from mineral ash and contains 9.6 per cent of nitrogen. This corresponds to 1.75 (—O—CH$_2$—CH$_2$—CN) groups per anhydroglucose unit.

In carrying out the reaction with large volumes of acrylonitrile as in Example 4, unchanged acrylonitrile may be recovered by allowing the filtrate remaining after the cellulose ether has been filtered, to stand in a separating funnel, whereupon the acrylonitrile and the water separate into two layers. The acryonitrile layer is separated, neutralized and distilled.

Example 5

1500 parts of viscose containing 8 per cent of cellulose (1 mol) and 6 per cent of caustic soda and having an ammonium chloride ripeness number of 1 are mixed with 117.9 parts (3 mols) of acrylonitrile in a bottle and agitated at 20° centigrade for 5 hours as described in Example 1. The reaction mixture is diluted with an equal volume of water and then treated as described in Example 1, whereby a water-soluble cellulose cyanoethyl ether is separated.

The product obtained is a white amorphous powder, soluble in water, acids and alkalies; it contains 0.35 per cent of mineral ash and 3.42 per cent of nitrogen, based on the dry ash-free sample. This corresponds to 0.45

(—O—CH$_2$—CH$_2$—CN)

group per anhydroglucose unit.

Example 6

1500 parts of viscose containing 8 per cent of cellulose (1 mol) and 25 per cent of caustic soda and having an ammonium chloride ripeness number of 11 are mixed with 117.9 parts (3 mols) of acrylonitrile in a bottle and shaken at 20° centigrade for 5 hours as described in Example 1. A water-insoluble ether is separated as described in Example 2.

The product is a white amorphous powder, insoluble in water but soluble in 1 per cent and 10 per cent aqueous caustic soda solutions. It contains 0.8 per cent of mineral ash and 0.5 per cent of nitrogen, based on the dry ash-free sample, corresponding to 0.05 (—O—CH$_2$—CH$_2$—CN) group per anhydroglucose unit. The ether also contains 0.14 (—O—CH$_2$—CH$_2$—COOH) group per anhydroglucose unit.

What I claim is:

1. The steps in the process for the production of a range of acetone-insoluble cyanoethyl ethers of cellulose which comprises mixing together viscose containing from 6% to 25% of caustic soda and from 0.5 to about 12 mols of acrylonitrile per anhydroglucose unit present in the cellulose of the viscose at a temperature between ordinary room temperature and about 40° C. and allowing the liquid mixture to remain at said temperature for about 3 to about 5 hours in order to effect a reaction between the acrylonitrile and the sodium cellulose xanthate in the viscose.

2. The steps in the process for the production of acetone-insoluble, water-insoluble, cyanoethyl ethers of cellulose which comprises mixing together viscose containing from 6 to 15% of caustic soda and from 0.5 mol to about 1.2 mols of acrylonitrile per anhydroglucose unit present in the cellulose of the viscose at a temperature between ordinary room temperature and about 40° C. and allowing the liquid mixture to remain at said temperature for about 3 to about 5 hours in order to effect a reaction between the acrylonitrile and the sodium cellulose xanthate in the viscose.

3. The steps in the process for the production of acetone-insoluble, water-soluble, cyanoethyl ethers of cellulose which comprises mixing together viscose containing from 6 to 10% of caustic soda and from 1.5 to 4.0 mols of acrylonitrile per anhydroglucose unit present in the cellulose of the viscose at a temperature between ordinary room temperature and about 40° C. and allowing the liquid mixture to remain at said temperature for about 3 hours to about 5 hours in order to effect a reaction between the acrylonitrile and the sodium cellulose xanthate in the viscose.

4. The steps in the process for the production of acetone-insoluble, water-insoluble, cyanoethyl ethers of cellulose which comprises mixing together viscose containing from 6 to 10% of caustic soda, and from 4 to 12 mols of acrylonitrile per anhydroglucose unit present in the cellulose of the viscose at a temperature between ordinary room temperature and about 40° C. and allowing the liquid mixture to remain at said temperature for about 3 hours to about 5 hours in order to effect a reaction between the acrylonitrile and the sodium cellulose xanthate in the viscose.

JAMES HUTCHISON MacGREGOR.

REFERENCES CITED

The following references are of record in the file of this patent:

UNITED STATES PATENTS

| Number | Name | Date |
|---|---|---|
| 1,188,376 | Lilienfeld | June 20, 1916 |
| 2,265,918 | Lilienfeld | Dec. 9, 1941 |
| 2,332,049 | Bock et al. | Oct. 19, 1943 |
| 2,349,797 | Bock et al. | May 30, 1944 |
| 2,375,847 | Houtz | May 15, 1945 |

Certificate of Correction

Patent No. 2,482,011 September 13, 1949

JAMES HUTCHISON MacGREGOR

It is hereby certified that error appears in the printed specification of the above numbered patent requiring correction as follows:

Column 1, line 6, for the word "water-soluble" read *water-insoluble*;

and that the said Letters Patent should be read with this correction therein that the same may conform to the record of the case in the Patent Office.

Signed and sealed this 10th day of January, A. D. 1950.

[SEAL]

THOMAS F. MURPHY,
*Assistant Commissioner of Patents.*